United States Patent
Yamaguchi et al.

(10) Patent No.: US 11,271,714 B2
(45) Date of Patent: Mar. 8, 2022

(54) TIME SYNCHRONIZATION SYSTEM, TIME MASTER, MANAGEMENT MASTER, AND TIME SYNCHRONIZATION METHOD

(71) Applicant: Mitsubishi Electric Corporation, Tokyo (JP)

(72) Inventors: Tomohisa Yamaguchi, Tokyo (JP); Atsushi Kajino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/269,255

(22) PCT Filed: Oct. 29, 2018

(86) PCT No.: PCT/JP2018/040075
§ 371 (c)(1),
(2) Date: Feb. 18, 2021

(87) PCT Pub. No.: WO2020/089962
PCT Pub. Date: May 7, 2020

(65) Prior Publication Data
US 2021/0167941 A1  Jun. 3, 2021

(51) Int. Cl.
*H04L 7/10* (2006.01)
*G06F 1/14* (2006.01)
*H04L 7/00* (2006.01)

(52) U.S. Cl.
CPC ............ *H04L 7/10* (2013.01); *G06F 1/14* (2013.01); *H04L 7/0016* (2013.01); *H04L 7/0091* (2013.01)

(58) Field of Classification Search
CPC ....... H04L 7/10; H04L 7/0016; H04L 7/0091; G06F 1/14
See application file for complete search history.

(56) References Cited

U.S. PATENT DOCUMENTS 9,760,114 B1  9/2017 Gopalakrishnan
2004/0196872 A1* 10/2004 Nakamura ............ H04J 3/0652
370/512

(Continued)

FOREIGN PATENT DOCUMENTS

CN  103873224 A  6/2014
JP  8-328690 A   12/1996

(Continued)

OTHER PUBLICATIONS

International Search Report and Written Opinion dated Dec. 18, 2018, received for PCT Application PCT/JP2018/040075, filed on Oct. 29, 2018, 6 pages including English Translation.

(Continued)

*Primary Examiner* — Sam K Ahn
*Assistant Examiner* — Amneet Singh
(74) *Attorney, Agent, or Firm* — Xsensus LLP

(57) ABSTRACT

A time synchronization system includes time masters and a management master. The management master includes a management master priority requester that transmits to each time master a priority request frame and a management master highest priority processor that transmits, to a time master holding a priority that is the highest among priorities of the time masters, a highest priority notification frame for changing the priority to the highest priority. Each of the time masters includes a time master priority responder that transmits to the management master a priority response frame after receiving the priority request frame from the management master (and a time master highest priority processor that changes the priority thereof to the highest priority when the highest priority notification frame is received from the management master. The grandmaster transmits, to each time master, a time notification frame for synchronization of a time of the time master.

9 Claims, 17 Drawing Sheets

(56) References Cited

U.S. PATENT DOCUMENTS

| | | | |
|---|---|---|---|
| 2010/0046494 A1 | 2/2010 | Palanki et al. | |
| 2013/0178219 A1* | 7/2013 | Lee | H04W 72/04 |
| | | | 455/450 |
| 2014/0023040 A1* | 1/2014 | Son | H04W 36/023 |
| | | | 370/331 |
| 2016/0277138 A1 | 9/2016 | Garg et al. | |
| 2017/0027004 A1* | 1/2017 | Lu | H04W 12/06 |
| 2017/0048671 A1 | 2/2017 | Marri Sridhar et al. | |
| 2018/0145821 A1* | 5/2018 | Pietilainen | H04J 3/0641 |
| 2020/0106826 A1* | 4/2020 | Kulkarni | H04L 67/025 |

FOREIGN PATENT DOCUMENTS

| | | |
|---|---|---|
| JP | 2001-36556 A | 2/2001 |
| JP | 2007-101183 A | 4/2007 |
| TW | 201014417 A | 4/2010 |
| TW | 201709761 A | 3/2017 |

OTHER PUBLICATIONS

Office Action dated Oct. 26, 2020, received for TW Application 108137656, 6 pages including English Translation.
Notice of Reasons for Refusal dated Apr. 2, 2019, received for JP Application 2019-505264, 4 pages including English Translation.
Decision to Grant dated Jun. 11, 2019, received for JP Application 2019-505264, 5 pages including English Translation.
German Office Action dated Oct. 12, 2021 in German Application No. 11 2018 007 928.7.

* cited by examiner

TIME SYNCHRONIZATION SYSTEM, TIME MASTER, MANAGEMENT MASTER, AND TIME SYNCHRONIZATION METHOD

CROSS-REFERENCE TO RELATED APPLICATION

The present application is based on PCT filing PCT/JP2018/040075, filed Oct. 29, 2018, the entire contents of which are incorporated herein by reference.

TECHNICAL FIELD

The present disclosure relates to a time synchronization system that employs a method for maintaining continuity of time synchronization, a time master and a management master that are used in the time synchronization system, and a time synchronization method.

BACKGROUND ART

In systems in which multiple devices connected to a network operate in synchronization with a time of a grandmaster that serves as a clock source, a time master among multiple time masters that has a priority that is the highest among priorities of the multiple time masters is conventionally selected as the grandmaster (refer to, for example, Patent Literature 1).

CITATION LIST

Patent Literature

Patent Literature 1: Unexamined Japanese Patent Application Publication No. H08-328690

SUMMARY OF INVENTION

Technical Problem

However, according to the selection method as disclosed in Patent Literature 1, when, for example, a time master having higher priority than that of the grandmaster is added in a state where each device operates with time synchronization, the time master having the high priority that is added to the system without synchronization with the time in the system is selected as the grandmaster. This causes a problem in that time synchronization deviation occurs in the system.

In order to solve the aforementioned problem, an objective of the present disclosure is to provide a time synchronization system in which no time synchronization deviation occurs even in the case where a time master having a priority higher than that of the grandmaster is added.

Solution to Problem

To solve the aforementioned problems and to achieve the aforementioned objective, a time synchronization system according to the present disclosure includes (i) time masters to hold time information and (ii) a management master to manage the time information and send, to one of the time masters holding a priority that is highest among priorities of the time masters, notification of a highest priority. The management master includes (i) a management master priority requester to transmit, when the time synchronization system starts operating, to each time master a priority request frame requesting a priority that is set for the time master in advance, and (ii) a management master highest priority processor to transmit, to the time master holding the priority that is highest among the priorities of the time masters, a highest priority notification frame for changing the priority of the time master to the highest priority. Each of the time masters includes (i) a time master priority responder to transmit, after receiving the priority request frame from the management master when the time synchronization system starts operating, to the management master a priority response frame as a response including the priority stored in the time master, (ii) a time master highest priority processor to change, when the highest priority notification frame is received from the management master, the priority of the time master to the highest priority, and (iii) a time master BMCA processor to execute processing of comparing the priority of the corresponding time master and the priority acquired from the time master other than the corresponding time master and selecting, as a grandmaster, the time master holding the priority that is highest among the priorities of the time masters. The grandmaster (i) maintains the holding of the highest priority after the time synchronization system starts operating and (ii) transmits, to the time master other than the time master selected as the grandmaster, based on the time information held in the grandmaster, a time notification frame for synchronization of a time of the time master.

Advantageous Effects of Invention

According to the time synchronization system according to the present disclosure, the priority of a time master selected as the grandmaster from among the time masters included in the time synchronization system at a time when the time system starts operating is changed to the highest priority. This prevents, even in the case where a time master having a priority higher than an original priority of the grandmaster is added after the time synchronization system stars operating, changing of the grandmaster from that selected at the time when the time system starts operating, and thus prevents occurrence of a time synchronization deviation.

Further, according to the time synchronization method according to the present disclosure, the priority of a time master selected as the grandmaster from among the time masters included in the time synchronization system at the time when the time system starts operating is changed to the highest priority. This prevents, even in the case where a time master having a priority higher than an original priority of the grandmaster is added after the time synchronization system stars operating, changing of the grandmaster from that selected at the time when the time system starts operating, and thus prevents the occurrence of time synchronization deviation.

DESCRIPTION OF EMBODIMENTS

Embodiment 1

Figure 1:
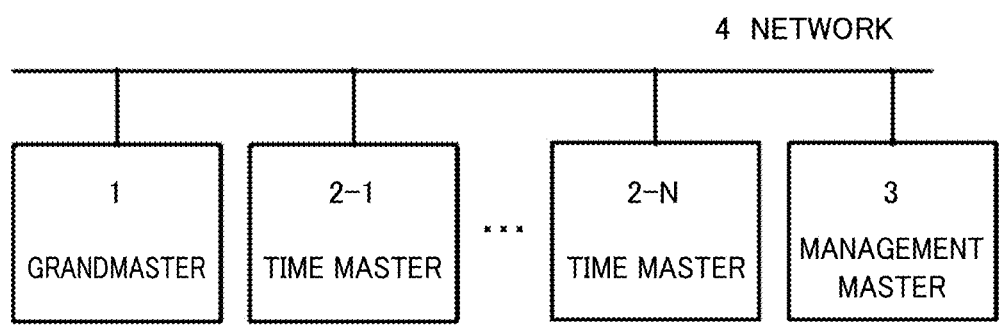
FIG. 1 illustrates an example configuration of a time synchronization system according to Embodiment 1 of the present disclosure.

FIG. 1 illustrates an example configuration of a time synchronization system according to Embodiment 1 of the present disclosure. A grandmaster 1 is a clock source of the time synchronization system, and only one grandmaster 1 is present in the system. A time master 2 is a device that holds time information, and a plurality of the time masters 2 are present in the system. One time master 2 of the plurality of time masters 2 is selected as the grandmaster 1 in a manner described later. A management master 3 manages information of the time masters 2 and sends notification of a highest priority to a time master 2 having a priority that is the highest among the priorities of the time masters 2, and only one management master 3 is present in the system. A network 4 establishes network connections between the devices.

The "priority" means information assigned for each time master 2 in the system and indicates a priority order used to select the grandmaster 1 from among the time masters 2. A user can freely set the priority. The "highest priority" means a priority of a time master 2 that is to serve as the grandmaster 1. In Embodiment 1, the priority that can be set for the time masters 2 is taken to be within the range "2"-"255", and the management master 3 sets the priority "1" for the time master 2 that is to serve as the grandmaster 1. In this case, when selecting the grandmaster 1 from among a time master 2 having the priority "2" and a time master 2 having the priority "10" that are included in the same system, the time master 2 having the priority "2" is selected. The priority increases with decrease in the number indicating the priority.

Figure 2:
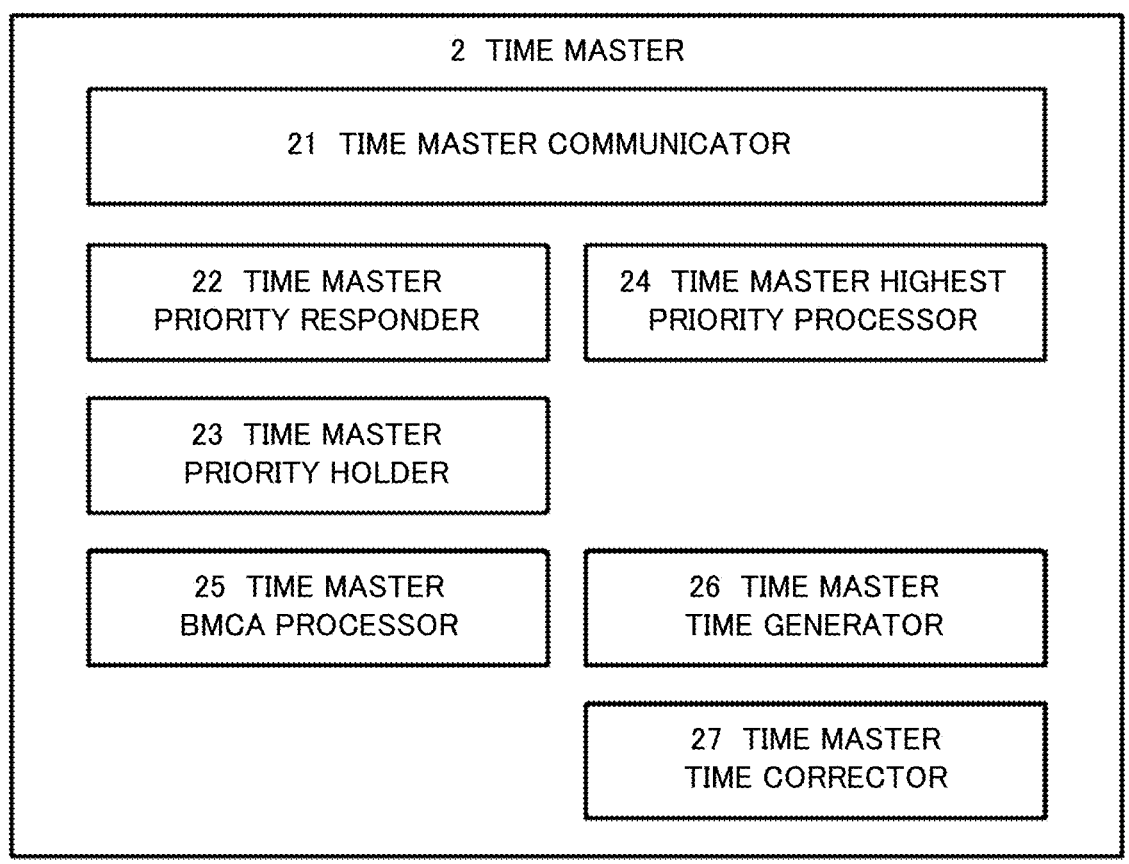
FIG. 2 is a block diagram illustrating configuration of a time master according to Embodiment 1 of the present disclosure.

FIG. 2 is a block diagram illustrating configuration of the time master 2. A time master communicator 21 communicates with other devices via the network 4. A time master priority responder 22, in response to a request from the management master 3 to acquire the priority, transmits a priority response frame to the management master 3. A time master priority holder 23 holds the priority of each time master 2. A time master highest priority processor 24, in response to a highest priority changing notification from the management master 3, changes the priority thereof to the highest priority. A time master best master clock algorithm (BMCA) processor 25, using the priority held by the time master priority holder 23, executes processing of selecting the grandmaster 1 as stipulated by IEEE1588, IEEE802.1AS-Rev or the like. Specifically, the time master BMCA processor 25 of each of the masters 2 selects the grandmaster 1 by repeatedly executing processing of comparing the local device priority and the priorities, acquired by non-illustrated means, from other time masters 2. A time master time generator 26 generates a time to be used for time synchronization. A time master time corrector 27 corrects a time generated by the time master time generator 26 to a time of the grandmaster 1.

Figure 3:
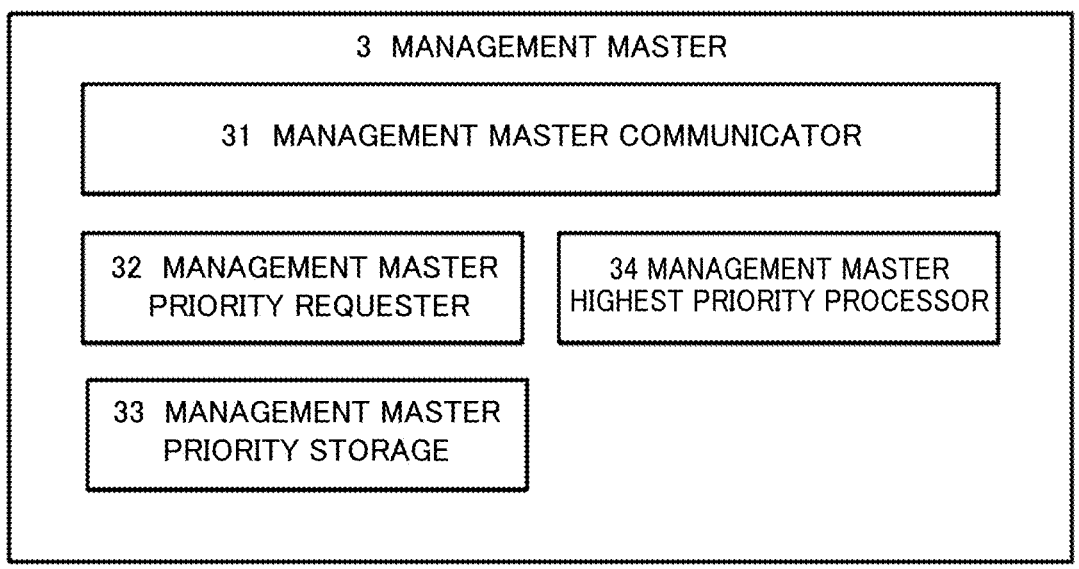
FIG. 3 is a block diagram illustrating configuration of a management master according to Embodiment 1 of the present disclosure.

FIG. 3 is a block diagram illustrating configuration of the management master 3. A management master communicator 31 communicates with other devices via the network 4. A management master priority requester 32, in order to check the priorities of the time masters 2, makes requests to acquire the priorities for the time masters 2. A management master priority storage 33 stores the priorities acquired from the time masters 2. A management master highest priority processor 34 sends, to a time master 2 having a priority that is the highest among the priorities acquired from the time masters 2, notification to change the priority to the highest priority. Although for ease of description the management master 3 according to Embodiment 1 does not execute time synchronization, the management master 3 may double as a time master and a time slave.

Figure 4:
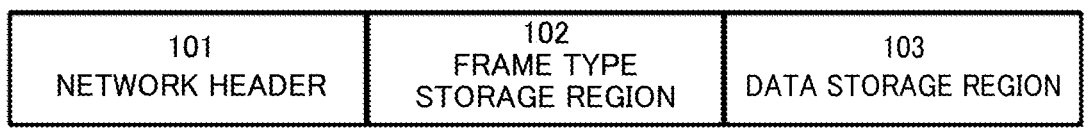
FIG. 4 illustrates a format of various types of frames communicated between the time master and the management master according to Embodiment 1 of the present disclosure.

FIG. 4 illustrates a format of various types of frames transmitted by the time masters 2 and the management master 3. A network header 101 stores data for transmission of a frame, such as a transmission source and a destination. A frame type storage region 102 stores a frame type, and in the case of a priority request frame transmitted by the management master priority requester 32 of the management master 3 to request the priority to the time master 2, the frame type storage region 102 stores an identifier of the priority request frame. A data storage region 103 stores, for example, the priority.

Figure 5:
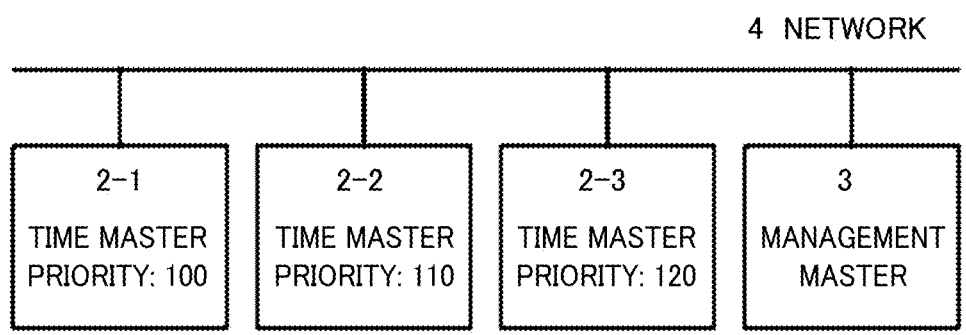
FIG. 5 illustrates an example configuration of the system, and priorities thereof, at a time when the system starts operating, according to Embodiment 1 of the present disclosure.

FIG. 5 illustrates an example configuration of the system, and priorities thereof, at a time when the system starts operating, according to Embodiment 1. At the time when the system starts operating, the grandmaster 1 is not yet selected, and each time master 2 holds in the time master priority holder 23 thereof a priority other than the highest priority "1", that is, a priority within the range "2"-"255".

In Embodiment 1, an operation of selecting the grandmaster 1 from among a time master 2-1 having the priority "100", a time master 2-2 having the priority "110", and a time master 2-3 having the priority "120", is explained. The priority of each time master 2 may be set freely such as by setting to a default value, by setting using a switch included in the time master, or by setting by an external tool.

Figure 6:
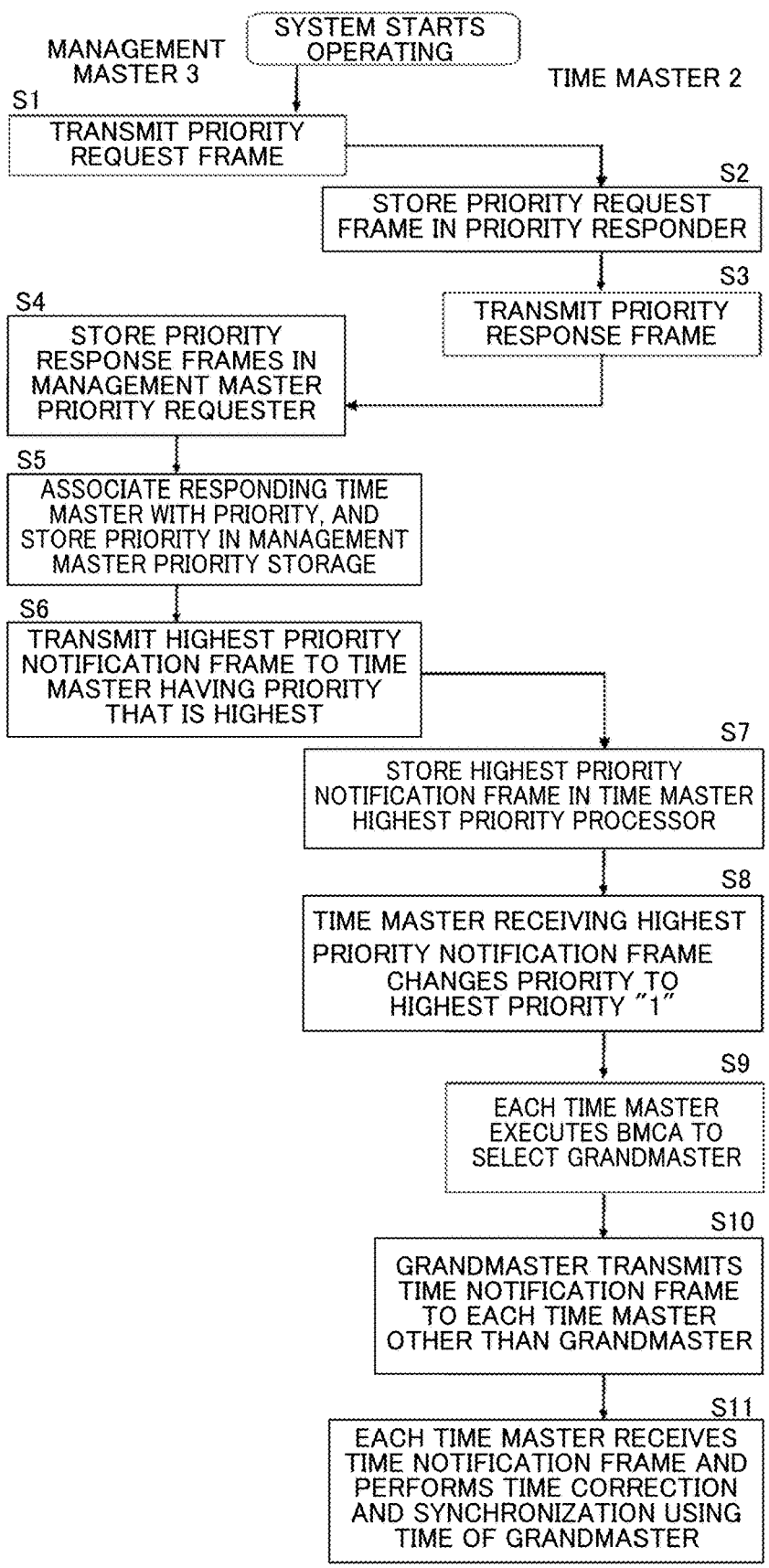
FIG. 6 is a flowchart for explanation of operation of the time synchronization system according to Embodiment 1 of the present disclosure.

FIG. 6 is a flowchart for explanation of operation of the time synchronization system according to Embodiment 1. In step S1, the management master priority requester 32 of the management master 3, in order to check the priority of each of the time masters 2, transmits the priority request frame to each time master 2 via the management master communicator 31.

In step S2, the time master communicator 21 of each of the time masters 2 receives the priority request frame transmitted by the management master 3 and stores the priority request frame in the time master priority responder 22. In step S3, the time master priority responder 22 retrieves the priority held in the time master priority holder 23 and transmits the priority response frame to the management master 3 via the time master communicator 21.

In step S4, the management master communicator 31 of the management master 3 receives the priority response frame from each time master 2 and stores the priority response frames in the management master priority requester 32. In step S5, the management master priority requester 32 associates the responding time master 2 with the priority thereof, and stores the priority in the management master priority storage 33. This associating with the time master 2 may be performed in any way that allows the time master communicator 21 of the time master 2 to identify a communication addressed to the local time master 2, for example, by using an IP address or a MAC address.

In step S6, the management master highest priority processor 34 of the management master 3 selects a priority that is the highest among the priorities stored in the management master priority storage 33 and transmits, to the time master 2 associated with this priority, a highest priority notification frame via the management master communicator 31. This "highest priority notification frame" is a frame for sending notification, to the time master 2 having the priority that is the highest among the priorities of the time masters 2 included in the system, that the priority of such time master 2 is the highest. The highest priority notification frame stores, in the frame type storage region 102 thereof, an identifier of the highest priority notification frame. Although selecting a time master having a priority that is the highest among the priorities of the time masters is described above, other conditions may be employed for this selection.

In step S7, the time master communicator 21 of the time master 2 receives the highest priority notification frame transmitted by the management master 3 and stores the highest priority notification frame in the time master highest priority processor 24 thereof. In step S8, the time master highest priority processor 24 changes the priority stored in the time master priority holder 23 to the highest priority "1".

While making this change, in order to return the priority to an original priority again in the case of changing of the time master 2 from the grandmaster 1 to a time master 2, the original priority is separately held in the time master priority holder 23.

Figure 7:
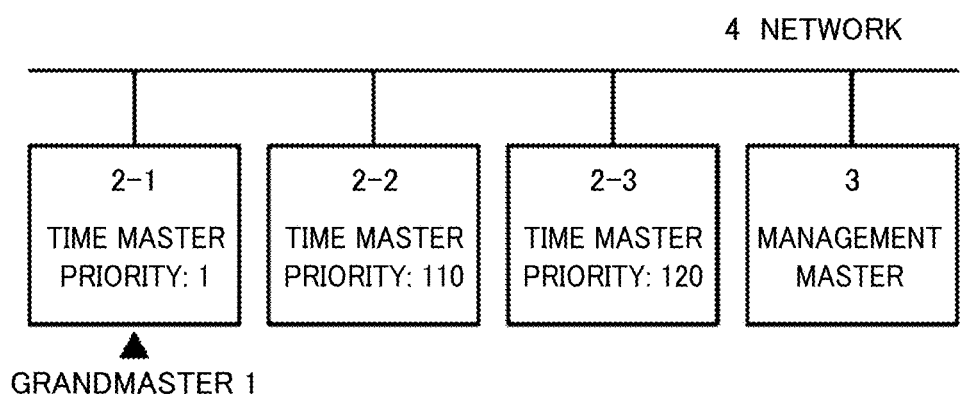
FIG. 7 illustrates an example configuration of the system, and priorities thereof, at a time when a grandmaster is selected, according to Embodiment 1 of the present disclosure.

In step S9, the time master BMCA processor 25 of each of the time masters 2 executes BMCA using the priority held in the time master priority holder 23, thereby selecting as the grandmaster 1 a time master 2 having a priority that is the highest among such priorities. In the case of the example of FIG. 7, the time master 2-1 is selected as the grandmaster 1.

In step S10, the grandmaster 1, that is, the time master 2-1, retrieves a time of the time master time generator 26 and transmits via the time master communicator 21 a time notification frame to each time master, that is, the time master 2-2, the time master 2-3, through a time master 2-N. The time notification frame stores in the frame type storage region 102 thereof an identifier of the time notification frame and stores in the data storage region 103 thereof the time of the grandmaster 1.

In step S11, each time master 2 receives the time of the grandmaster 1 via the time master communicator 21, and the time master time corrector 27 corrects the time of the time master time generator 26 using the received time, thereby executing the time synchronization. The time synchronization system, by executing the processes from step S1 to step S11 described above, executes the time synchronization with the time of the grandmaster 1.

Figure 8:
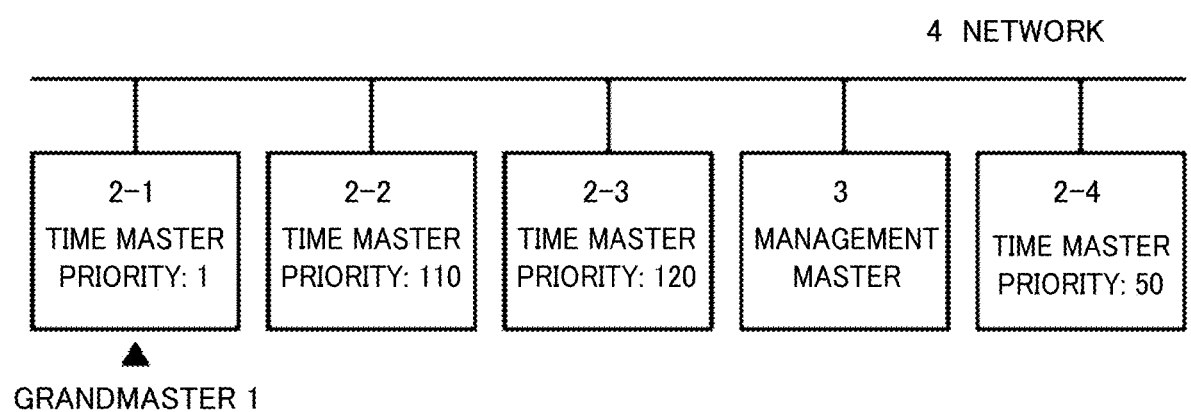
FIG. 8 illustrates an example configuration of the system, and priorities thereof, in a case where a time master having a priority higher than an original priority of the grandmaster is added, according to Embodiment 1 of the present disclosure.

Here, even in the case where BMCA is executed after a time master 2-4 having the priority "50" that is higher than the original priority "100" of the grandmaster 1 is connected to the system as illustrated in FIG. 8 after the system starts operating, changing of the grandmaster 1 does not occur since the priority of the grandmaster 1, that is, the time master 2-1, is changed to the highest priority "1".

Further, although the priority that can be set for each device is taken to be within the range "2"-"255" in Embodiment 1, in the case of a system that includes, for example, both a time master 2 that provides a high-accuracy clock source and a time master 2 that provides a low-accuracy clock source, the priorities may be classified such that the time master that provides a high-accuracy clock source is reliably selected.

For example, time deviation is less likely to occur in a time master 2 that provides a clock source using hardware (H/W), since the H/W holds a time upon transmission and receipt of various types of frames, and thus the performance thereof does not depend on a processing time of software (S/W). Such a time master 2 can provide a more accurate clock source than that of a time master 2 that provides a clock source using S/W without the assistance of H/W. In the case of these time masters 2, reliable selection of the time master 2 that provides a high-accuracy clock source is achieved by classifying the priorities such that the priority of the time master 2 that provides a high-accuracy clock source using the H/W is set within a high priority range "2"-"127" and the priority of the time master 2 that provides a clock source using the S/W without the assistance of the H/W is set within a low priority range "128"-"255".

As described above, according to the time synchronization system according to Embodiment 1, the grandmaster 1 is set to the highest priority, and thus changing of the grandmaster 1 does not occur even in the case where BMCA is executed after a time master 2 having a priority that is higher than the priority of the grandmaster 1 before being selected as the grandmaster 1, that is, higher than the original priority of the grandmaster 1, is connected to the system after the system starts operating. This has the effect of preventing the occurrence of time synchronization deviation in the time synchronization system.

Embodiment 2

Figure 9:
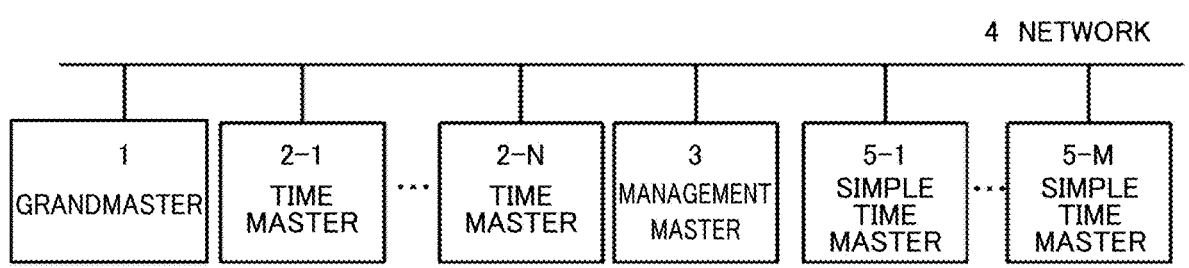
FIG. 9 illustrates an example configuration of a time synchronization system according to Embodiment 2 of the present disclosure.

FIG. 9 illustrates an example configuration of a time synchronization system according to Embodiment 2 of the present disclosure. Structural elements that are the same as in Embodiment 1 are denoted by the same reference signs, and detailed description of such is omitted.

A simple time master 5 (5-1-5-M) is a device that holds time information and is a time master that executes BMCA without handling various types of requests transmitted from the management master 3, and a plurality of the simple time master 5 may be present in the system. Further, the simple time master 5 may transmit the time notification frame. The simple time master 5, the examples of which include a time server, can achieve a more accurate clock. The simple time master 5 can also serve as the grandmaster 1.

In Embodiment 2, the priority that can be set for the time masters 2 is taken to be within the range "11"-"255", the highest priority that can be set by the management master 3 for the time master 2 is "10", and the priority that can be set for the simple time masters 5 is taken to be within the range "1"-"9".

Figure 10:
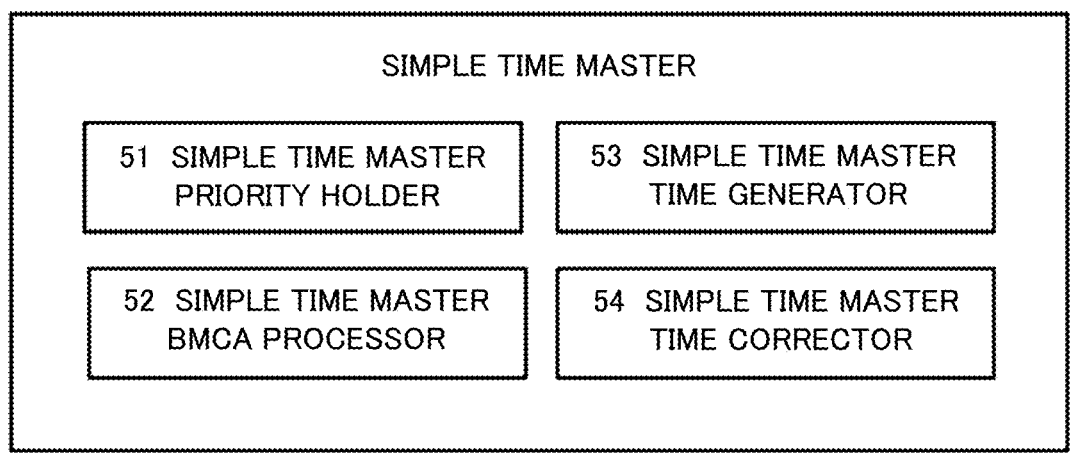
FIG. 10 is a block diagram illustrating configuration of a time master according to Embodiment 2 of the present disclosure.

FIG. 10 is a block diagram illustrating configuration of the simple time master 5. A simple time master priority holder 51 holds the priority. A simple time master BMCA processor 52, using the priority held by the simple time master priority holder 51, executes processing of selecting the grandmaster 1 as stipulated by IEEE1588, IEEE802.1AS-Rev or the like. A simple time master time generator 53 generates a time to be used for time synchronization. A simple time master time corrector 54 corrects a time generated by the simple time master time generator 53 to a time of the grandmaster 1.

Figure 11:
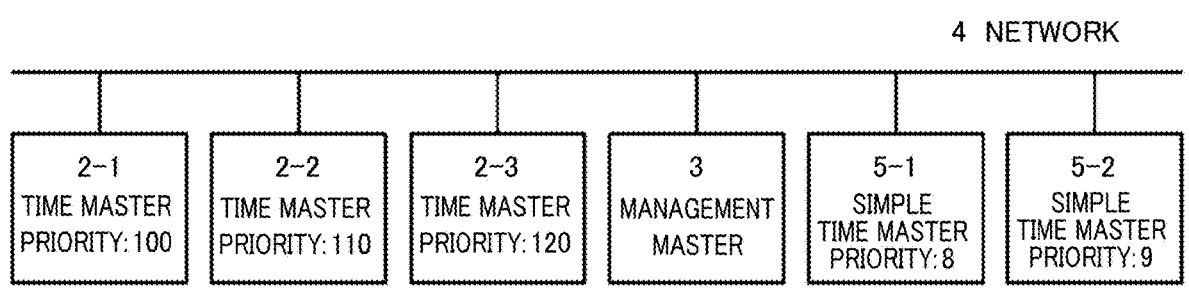
FIG. 11 illustrates an example configuration of the system, and priorities thereof, at a time when the system starts operating, according to Embodiment 2 of the present disclosure.

FIG. 11 illustrates an example configuration of the system, and priorities thereof, at a time when the system starts operating, according to Embodiment 2. At the time when the system starts operating, the grandmaster 1 is not yet selected, and each time master 2 holds in the time master priority holder 23 thereof a priority that is within the range "11"-"255" and is not the highest priority "10". Each simple time master 5 holds in the simple time master priority holder 51 thereof a priority within the range "1"-"9" that is higher than the highest priority "10".

In Embodiment 2, an operation of selecting the grandmaster 1 from among a time master 2-1 having the priority "100", a time master 2-2 having the priority "110", a time master 2-3 having the priority "120", a simple time master 5-1 having the priority "8", and a simple time master 5-2 having the priority "9", is explained. Although the highest priority is set to be "10" in Embodiment 2, the highest priority may be variable so as to enable adjustment of a priority range that is set for the simple time masters 5 or may be set upon startup of the system.

The time masters 2 and the management master 3 communicate similarly to the processes of step S1 to step S8 in Embodiment 1, and the priority of a time master 2 having a priority that is the highest among priorities of the time masters 2 is changed to the highest priority "10".

Figure 12:
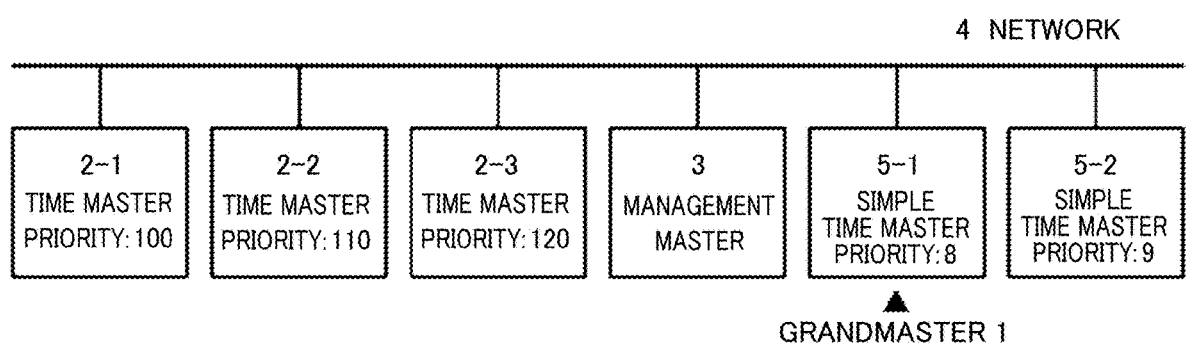
FIG. 12 illustrates an example configuration of the system, and priorities thereof, at a time when a grandmaster is selected, according to Embodiment 2 of the present disclosure.

Then the time master BMCA processor 25 of each of the time masters 2 executes BMCA using the priority held in the time master priority holder 23 and the simple time master BMCA processor 52 executes BMCA using the priority held in the simple time master priority holder 51, thereby selecting as the grandmaster 1 a time master 2 or a simple time master 5 having a priority that is the highest. In the case of the example of FIG. 12, the simple time master 5-1 is selected as the grandmaster 1.

Then, similarly to step S11 in Embodiment 1, each time master 2 and each simple time master 5, after executing BMCA, executes the time synchronization with the time of the grandmaster 1.

Figure 13:
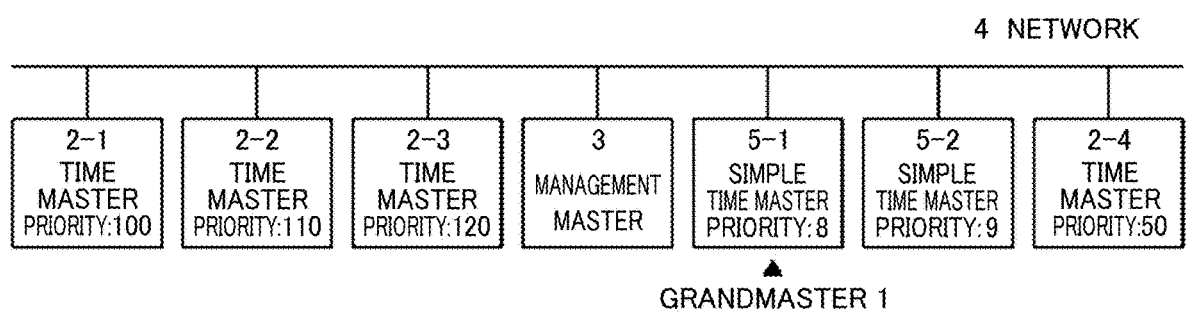
FIG. 13 illustrates an example configuration of the system, and priorities thereof, at a time when a time master having a priority higher than an original priority of another time master having a highest priority is added, according to Embodiment 2 of the present disclosure.

Here, even in the case where BMCA is executed after a time master 2-4 having the priority "50" that is higher than the highest priority "100" of the time master 2-1 is added to the system as illustrated in FIG. 13 after the system starts operating, changing of the grandmaster 1, that is, changing from the simple time master 5-1, does not occur, since the priorities for the simple time masters 5 are set within the priority range higher than the highest priority "10" that is the highest among the priorities of the time masters 2.

As described above, according to the time synchronization system according to Embodiment 2, a priority range higher than the highest priority that is the highest among the priorities of the time masters 2 is set, and the priorities of the simple time masters 5 that do not handle changing of the highest priority are set within the priority range. This allows the simple time master 5 to serve as the grandmaster 1. Further, in the case where the simple time master 5 serves as a time server, setting the simple time master 5 as the grandmaster 1 can achieve a more accurate clock.

Furthermore, the priority that is set for the grandmaster 1 is higher than a priority that is the highest among the priorities of time masters 2, that is, the highest priority that is set for a time master 2 of the time masters 2 to perform changing to the highest priority. Thus, changing of the grandmaster 1 does not occur even in the case where BMCA is executed after a time master having a priority that is higher than the original priority of a time master 2 having the highest priority is connected as illustrated in FIG. 13. This has the effect of preventing the occurrence of time synchronization deviation.

Embodiment 3

In Embodiment 3, an example is described in which a time master 2 having a priority that is higher than any of priorities of the time masters 2 and the simple time masters 5 included in the system is newly added after executing the time synchronization using the time held by the simple time master 5 that achieves a more accurate clock than the time masters 2. An example configuration of a time synchronization system according to Embodiment 3 is similar to that of Embodiment 2. In Embodiment 3, the priority that can be set for the time masters 2 and the simple time masters 5 is taken to be within the range "2"-"255", and the highest priority that can be set by the management master 3 for the time master 2 is "1".

Figure 14:
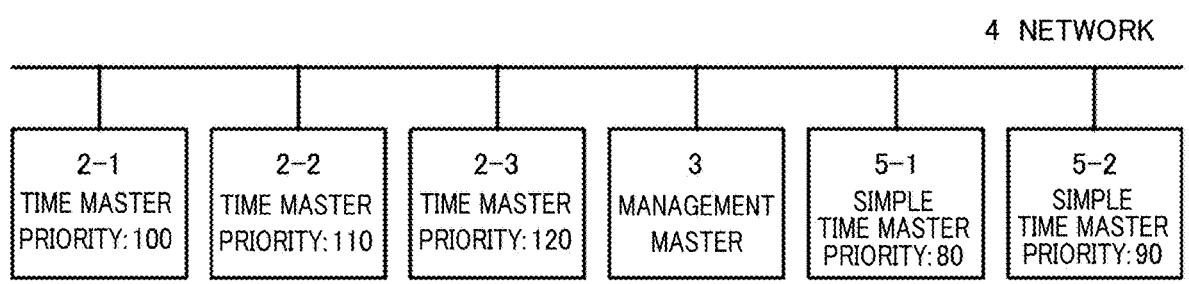
FIG. 14 illustrates an example configuration of the system, and priorities thereof, at a time when the system starts operating, according to Embodiment 3 of the present disclosure.

FIG. 14 illustrates an example configuration of the system, and priorities thereof, at a time when the system starts operating, according to Embodiment 3. At the time when the system starts operating, the grandmaster 1 is not yet selected, and each time master 2 holds in the time master priority holder 23 thereof a priority that is within the range "2"-"255" and is not the highest priority "1", and each simple time master 5 holds in the simple time master priority holder 51 thereof a priority that is within the range "2"-"255" and is not the highest priority "1".

In Embodiment 3, an operation of selecting the grandmaster 1 from among a time master 2-1 having the priority "100", a time master 2-2 having the priority "110", a time master 2-3 having the priority "120", a simple time master 5-1 having the priority "80", and a simple time master 5-2 having the priority "90", is explained.

Figure 15:
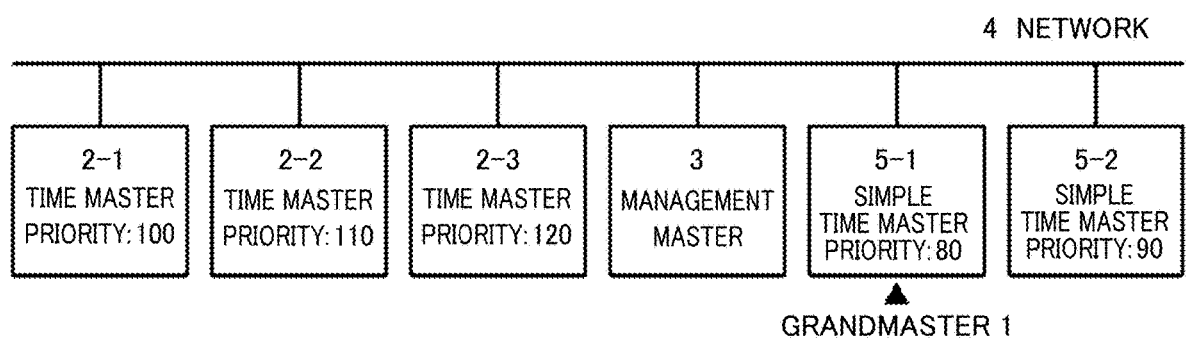
FIG. 15 illustrates an example configuration of the system, and priorities thereof, at a time when a grandmaster is selected, according to Embodiment 3 of the present disclosure.

The time master BMCA processor 25 of each of the time masters 2 executes BMCA using the priority held in the time master priority holder 23 and the simple time master BMCA processor 52 executes BMCA using the priority held in the simple time master priority holder 51, thereby selecting as the grandmaster 1 a time master 2 or a simple time master 5 having a priority that is the highest. In FIG. 15, the simple time master 5-1 is selected as the grandmaster 1.

Then, similarly to Embodiment 1 and Embodiment 2, the management master 3 checks the priority of each of the time masters 2 and transmits, to the time master 2-1 having the priority that is the highest among the priorities of the time masters 2, a highest priority notification frame. In response to the time master 2-1 receiving the highest priority notification frame, the time master highest priority processor 24 of the time master 2-1 stores, in non-illustrated storage means, the receipt of the highest priority notification frame. Changing of the priority held in the time master priority holder 23 is not performed at this time.

Figure 16:
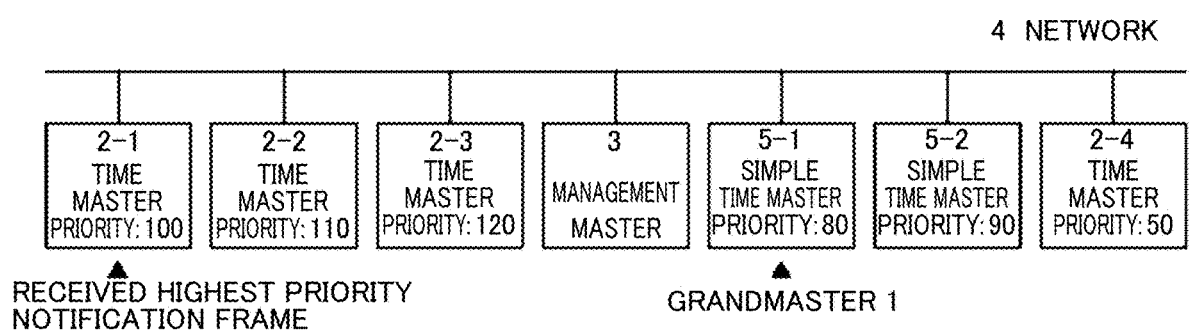
FIG. 16 illustrates an example configuration of the system, and priorities thereof, at a time when a time master having a priority that is the highest is added, according to Embodiment 3 of the present disclosure.

A time master 2-4 having a priority that is highest is connected as illustrated in FIG. 16 after the system starts operating, and then execution of BMCA starts. When BMCA is started in this state, the time master BMCA processor 25 of the time master 2-1 that receives the highest priority notification frame detects, in the processes to execute BMCA, that the priority of the added time master 2-4 is higher than the priority of a current grandmaster 1.

Figure 17:
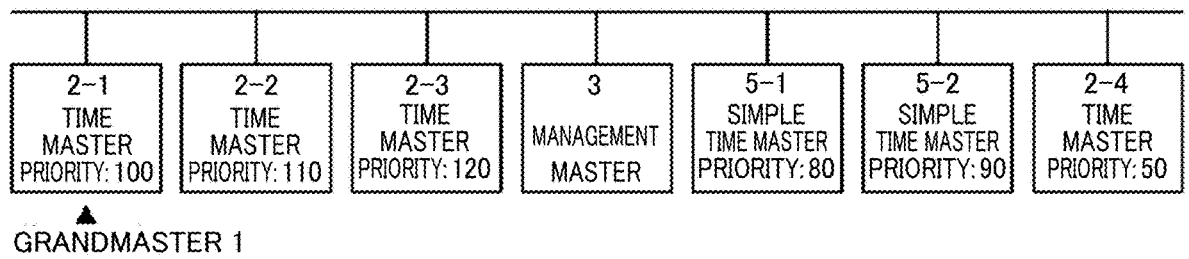
FIG. 17 illustrates an example configuration of the system, and priorities thereof, at a time when a grandmaster having a highest priority is selected, according to Embodiment 3 of the present disclosure.

The time master BMCA processor 25 that detects connection of the time master 2-4 having the priority that is highest sends, to the time master highest priority processor 24, notification of the connection of the time master 2-4 having the priority that is highest. The time master highest priority processor 24 having received the notification changes the priority held in the time master priority holder 23 to the highest priority "1" and sends notification of this change to the time master BMCA processor 25. The time master BMCA processor 25 having received this notification executes BMCA with the highest priority "1", and thus the time master 2-1 having the highest priority "1" is set to be the grandmaster 1 as illustrated in FIG. 17. Although an example of connecting an additional time master 2 is described in Embodiment 3, connection of an additional simple time master 5 may be similarly performed.

As described above, according to the time synchronization system according to Embodiment 3, in the case where the simple time master 5-1 is set to be the grandmaster 1, the highest priority notification frame is transmitted beforehand to a time master 2 having a priority that is the highest among the time masters 2 that are included in the system and are in time synchronization with the grandmaster 1, that is, the simple time master 5-1, and changing to the highest priority of the priority of the time master 2 that receives the highest priority notification frame is performed at a time of addition of an additional time master 2 having the priority that is higher than any of the priorities of the time masters. This can prevent the newly added time master 2 from being changed to have the highest priority and becoming the grandmaster 1. Further, even when changing of the grandmaster 1 occurs from the simple time master 5-1 to the time master 2-1, the new grandmaster 1, that is, the time master 2-1, is already in time synchronization with the system. This has the effect of preventing the occurrence of time synchronization deviation.

REFERENCE SIGNS LIST

1 Grandmaster
2 Time master
3 Management master
4 Network
5 Simple time master
21 Time master communicator
22 Time master priority responder
23 Time master priority holder
24 Time master highest priority processor
25 Time master BMCA processor
26 Time master time generator
31 Management master communicator
32 Management master priority requester
33 Management master priority storage
34 Management master highest priority processor
51 Simple time master priority holder
52 Simple time master BMCA processor
53 Simple time master time generator
54 Simple time master time corrector
101 Network header
102 Frame type storage region
103 Data storage region

The invention claimed is:
1. A time synchronization system comprising:
time masters to hold time information; and
a management master to manage the time information and send, to one of the time masters, notification of a highest priority, the one of the timer masters holding a priority that is highest among priorities of the time masters, wherein
the management master includes
a management master priority requester to transmit, when the time synchronization system starts operating, to each of the time masters a priority request frame requesting a priority that is set for the each of the time masters in advance, and
a management master highest priority processor to transmit, to the one of the time masters holding the priority that is highest among the priorities of the time masters, a highest priority notification frame for changing the priority of the one of the time masters to the highest priority,
each of the time masters includes
a time master priority responder to transmit, after receiving the priority request frame from the management master when the time synchronization system starts operating, to the management master a priority response frame as a response including the priority stored in the each of the time masters,
a time master highest priority processor to change, when the highest priority notification frame is received from the management master, the priority of the one of the time masters to the highest priority, and
a time master best master clock algorithm (BMCA) processor to execute processing of comparing the priority of each of the time masters and the priority acquired from the time master other than the each of the time masters and selecting, as a grandmaster, the one of the time masters holding the priority that is highest among the priorities of the time masters, and
the grandmaster (i) maintains the holding of the highest priority after the time synchronization system starts operating and (ii) transmits, to each of the time masters other than the grandmaster, based on the time information held in the grandmaster, a time notification frame for synchronization of a lime of at least one of the time masters other than the grandmaster.

2. The time synchronization system according to claim 1, further comprising:
   simple time masters to hold the time information,
   wherein each of the simple time masters compares a priority of the each of the simple time masters and the priorities acquired from the time masters and at least one of the simple time masters other than the each of the simple time masters and transmits the time notification frame.

3. The time synchronization system according to claim 2, wherein the priorities that are set for the simple time masters are higher than the highest priority that is settable for the time masters.

4. A time synchronization system comprising:
   time masters to hold time information;
   simple time masters to hold the time information, each of the simple time masters being to (i) compare a priority of the each of the simple time masters and priorities acquired from the time masters and the simple time master other than the each of the simple time masters and (ii) transmit a time notification frame; and
   a management master to manage the time information and send, to one of the time masters, notification of a highest priority, the one of the time masters holding a priority that is highest among the priorities of the time masters, wherein
   the management master includes
      a management master priority requester to transmit, when the time synchronization system starts operating, to each of the time masters a priority request frame requesting a priority that is set for the each of the time masters in advance, and
      a management master highest priority processor to transmit, to the one of the time masters holding the priority that is highest among the priorities of the time masters, a highest priority notification frame for changing the priority of the one of the time masters to the highest priority,
   each of the time masters includes
      a time master priority responder to transmit, after receiving the priority request frame from the management master when the time synchronization system starts operating, to the management master a priority response frame as a response including the priority stored in the each of the time masters,
      a time master highest priority processor to change, when the highest priority notification frame is received from the management master, the priority of the one of the time masters to the highest priority that is to be held by a grandmaster,
   the grandmaster transmits, when the time synchronization system starts operating, to each of the time masters other than the grandmaster, based on the time information held in the grandmaster, a time notification frame for synchronization of a time of the at least one of the time masters other than the grandmaster, and
   after the time masters and the simple time masters execute the time synchronization with the time of the grandmaster, the one of the time masters that receives from the management master the highest priority notification frame changes, at a time when an additional time master or simple time master that holds a priority that is higher than any of the priorities of the time masters and the simple time masters is newly connected, the priority thereof to the highest priority to serve as the grandmaster.

5. A time master to hold time information, comprising:
   a time master priority responder to transmit, when a priority request frame requesting a priority that is set for the time master in advance is received, a priority response frame as a response including the priority;
   a time master highest priority processor to change, when a highest priority notification frame is received, the priority to a highest priority; and
   a time master best master clock algorithm (BMCA) processor to execute processing of comparing the priority of the time master and at least one priority acquired from at least one of another of the time master and selecting, as a grandmaster, a time master holding a priority that is highest among the priorities of the time master and the at least one of another of the time master,
   wherein the time master (i) maintains the holding of the highest priority when an additional time master is added to a time synchronization system after the time synchronization system starts operating, the additional time master holding a priority higher than an original priority of the time master selected as the grandmaster and (ii) transmits, to the at least one of another of the time master, based on the time information held in the grandmaster, a time notification frame for synchronization of a time of the at least one of another of the time master.

6. A time synchronization method in a time synchronization system comprising time masters to hold time information and a management master to manage the time information and send, to one of the time masters, notification of a highest priority, the one of the time masters holding a priority that is highest among priorities of the time masters, the time synchronization method comprising:
   when the time synchronization system starts operating, transmitting by the management master to each of the time masters a priority request frame requesting a priority that is set for the each of the time masters in advance,
   transmitting by the management master, to the one of the time masters holding the priority that is highest among the priorities of the time masters, a highest priority notification frame for changing the priority of the one of the time masters to the highest priority,
   in response to each of the time masters receiving the priority request frame from the management master, transmitting by the each of the time masters to the management master a priority response frame as a response including the priority stored in the each of the time masters,
   in response to the one of the time masters receiving the highest priority notification frame from the management master, changing, by the one of the time masters, the priority thereof to the highest priority,
   comparing, by each of the time masters, the priority of the each of the time masters and the priority acquired from each of the time masters other than the each of the time masters and selecting, by the each of the time masters, as a grandmaster, the one of the time masters holding a priority that is highest among the priorities of the time masters, and
   maintaining, by the one of the time masters selected as the grandmaster, the holding of the highest priority after the time synchronization system starts operating and transmitting, by the one of the time masters selected as the grandmaster, to each of the time masters other than the grandmaster, based on the time information held in the grandmaster, a time notification frame for synchronization of a time of the at least one of the time masters other than the grandmaster.

7. The time synchronization method according to claim 6, wherein the time synchronization system includes simple time masters, and each of the simple time masters compares a priority of the each of the simple time masters and the priorities acquired from the time masters and a simple time master other than the each of the simple time masters and transmits the time notification frame.

8. The time synchronization method according to claim 7, wherein the priorities that are set for the simple time masters are higher than the priorities that are set for the time masters.

9. The time synchronization method according to claim 8, further comprising:

transmitting, to the one of the time masters that holds a priority that is highest among the priorities of the time masters, the highest priority notification frame, and when an additional time master or simple time master that holds a priority higher than the priorities of the time masters and the simple time masters is newly connected to the time synchronization system, changing by the one of the time masters that receives the highest priority notification frame the priority thereof to the highest priority that is to be held by the grandmaster.

\* \* \* \* \*